Jan. 27, 1959 W. ZIESE 2,871,099
PROCESS FOR THE CONTINUOUS PRODUCTION OF HYDROGELS
CONTAINING SILICIC ACID
Filed Feb. 1, 1956
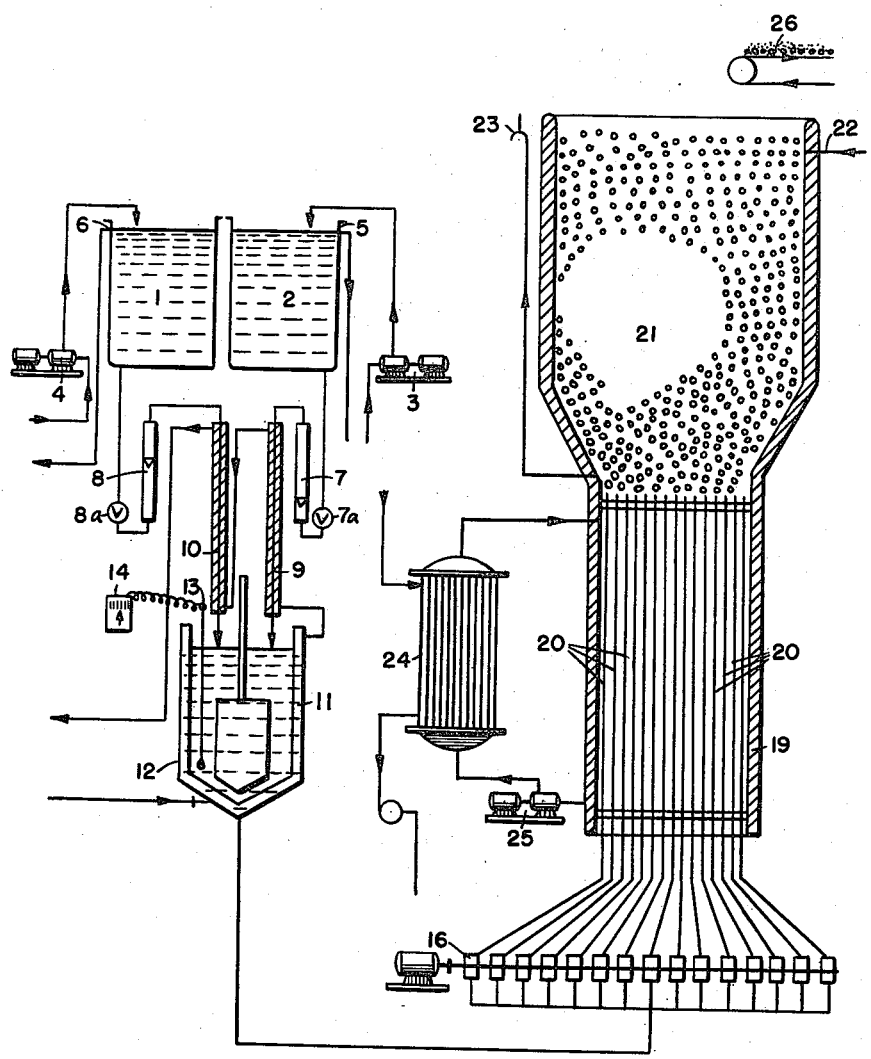
INVENTOR:
WALTER ZIESE
BY
ATT'Y United States Patent Office 2,871,099
Patented Jan. 27, 1959

2,871,099

PROCESS FOR THE CONTINUOUS PRODUCTION OF HYDROGELS CONTAINING SILICIC ACID

Walter Ziese, Ludwigshafen (Rhine), Germany, assignor to Badische Anilin- & Soda-Fabrik Aktiengesellschaft, Ludwigshafen (Rhine), Germany Application February 1, 1956, Serial No. 562,894

Claims priority, application Germany February 3, 1955

5 Claims. (Cl. 23—182)

This invention relates to a process for continuously producing elastic hydrogels containing silicic acid in the form of rods having a small diameter.

It is known that silicic acid hydrogels can be prepared by reacting waterglass solution with acids, as for example sulfuric acid, whereby first unstable silicic acid hydrosol is formed and this hydrosol then solidifies to an elastic jelly upon undisturbed standing. Usually this process is carried out discontinuously by stirring waterglass solution into cooled dilute sulfuric acid or another acid until the mixture has a pH-value of about 2.5 to 4. The sol thus formed is then allowed to solidify in shallow troughs. When the jelly thus formed has reached its maximum strength, it is broken up into pieces of the size of the first to the size of walnuts, freed from adherent salts, as for example sodium sulfate, by repeatedly covering it with water, washed out, dried and activated.

The said process is troublesome and time-consuming and permits only small throughputs. It has therefore been proposed to make the process wholly or partly continuous. Thus it is known to carry out the partial process of sol formation as a flow process, for example by supplying sulfuric acid and waterglass solution to rotary mixers in which the sol is formed and from which it is continuous removed.

It has also been proposed to carry out continuously the whole process of the hydrogel preparation including the comminution and the washing out of the hydrogel obtained. The methods and apparatus hitherto known for this purpose have the disadvantage, however, that the hydrosol during its passage through tubes of relatively wide cross-section has been brought to solidification. In this way hydrogel bodies of large diameter are formed and these must be separated in the form of blocks by mechanical means. In order to facilitate the movement and comminution of such bodies it has been proposed to move them down in the tubes corresponding to the direction of gravity.

I have found that elastic hydrogels containing silicic acid can be prepared from alkali silicates and inorganic acids with the intermediate formation of an unstable sol containing silicic acid in a continuous manner while avoiding the said disadvantages by leading the sol containing silicic acid through a plurality of tubes having a smooth internal surface and a preferred internal diameter, comprised between about 20 and about 70 millimeters. The tubes which are preferably arranged in an upright position are heated to about 40° C. up to about 100° C. so that the sol, while passing through the tubes, is solidified to the hydrogel, the hydrogel being removed from the tubes in the form of the rods thereby formed; the rods may then, if desired, be broken up and purified by being covered with water or other liquids suitable for the removal of salts adhering to the hydrogel, such as weak acids or bases. The number of tubes which can be used in the practice of my invention is not confined to any definite figure. According to practical requirement any number up to 200 tubes or more can be used.

The unstable silicic acid sol can be prapered by adding acid to a sodium silicate solution, as for example commercial waterglass solution, if desired diluted, the whole being well stirred and preferably cooled in order to prevent a premature solidification of the reaction mixture. The reaction is preferably discontinued when a pH-value of the solution of between 2 and 5 has been reached. If it is desired to form a silica sol containing metail oxide, acidified or acid-reacting solutions of metal salts, in particular those of metals of the 3rd and 4th groups of the periodic system, are used instead of acids. Thus a silicic acid sol containing aluminium oxide can be prepared by stirring waterglass solution into cooled sulfuric acid containing aluminium sulfate. It is also possible, however, to mix unstable silicic acid sol with sols containing metal oxides and to subject these mixtures to the process according to this invention. Unstable sols containing silicic acid suitable for carrying out the process can also be obtained by saponification of silicic acid esters; it is also possible to start from chloror brom-silanes and to saponify these compounds, preferably in the presence of substances which do not bind the halogen ionogenically, for example in the presence of alkylene oxides.

For the conversion of the unstable sols containing silicic acid into hydrogels, the sol in question is preferably divided into partial streams by supplying it to the individual tubes of a tube system, preferably a bundle of tubes such as is present in heat-exchangers. This supply can be effected by a number of conveyor pumps, in particular membrane pumps, arranged in parallel. By these pumps, the conveyed volume of which is adjusted to the prevailing operating conditions, the sol is led from a reservoir into the heated tubes. Tubes of thermoplastic materials, such as polystyrene, polyvinyl compounds or polyacrylic compounds, have proved especially suitable. However, corrosion-proof metal tubes, enamelled tubes or tubes coated with stoving enamel, ceramic tubes or glass tubes are also suitable. In order to ensure the smoothest possible internal surface of the wall of the tubes it is preferable to use tubes of which the inner surface has been polished. The resistance which a tube with a smooth inner surface offers to the passage therethrough of the sol solidifying therein or the hydrogel formed is only slight. The heating of the tube arrangement, when heating is employed, is effected externally, preferably by a liquid led in circulation.

The hydrogel can be treated and dried in the usual way. It is preferable to arrange for that side of the tube system at which the hydrogel leaves the tubes in the form of hydrogen rods to open into a washing container which is directly attached to the tube system and if desired has a larger cross-section than the tube system. After the appearance of the first hydrogel rods after setting the plant in operation, the washing container is filled with water. Since the hydrogel has a specific gravity which is not much higher than that of the surrounding washing water which is more or less enriched with salts, it is possible to work with a considerable height of the washing column without the risk of the hydrogel being crushed by the weight of the layer above it. The pure water is preferably introduced at the top of the washing container and the salt-containing water withdrawn at the bottom of the container at such a rate that the level in the washing container remains constant. The gel which is slowly conveyed upwards leaves the top of the washing container in purified form and can be taken from thence to the drying plant by means of a conveyer belt. Instead of pure water, it is also possible to use for the washing process, in order to obtain predetermined hydrogel properties, acidified water, water containing aluminium salts, or water which has been rendered alkaline, in particular ammoniacal water. The washing of the hydrogel can be carried out at temperatures between 20° and 100° C.

The following example will further illustrate this invention but the invention is not restricted to this example.

*Example*

A pressure-resistant cylindrical chromium-nickel steel vessel is filled with unstable silicic acid sol which has been prepared by stirring waterglass solution ($d=1.16$) into dilute sulfuric acid ($d=1.23$) cooled with ice, the supply of waterglass solution having been discontinued when the mixture has reached a pH-value of 4.0. The vessel is also cooled externally with ice to prevent premature solidification of the unstable sol to the hydrogel. The cooled sol is forced, by means of compressed air acting on the gas space of the container (the amount of which is controlled by a valve), in a slow stream through ascending tubes into four internally polished polymethacrylic acid ester tubes, each of a length of 1 meter and an internal width of 34 millimeters and superposed on the container, these also being controlled by valves. Each tube is heated by means of a heating jacket of glass through which is pumped in circulation water at 70° C. from a thermostat. The unstable sol rising in the tubes at a speed of flow of about 1 centimeter per minute solidifies to a gell in such a way that the sol is present in the lower part of the tubes still as a liquid, in the transition zone it is present as a viscous intermediate product and in the upper part as an elastic solid jelly. A force corresponding to a pressure of about 0.75 excess atmosphere is amply sufficient to move the contents of the tubes. The hydrogel becomes detached somewhat from the wall, slides upwards in the tubes without difficulty and can be withdrawn at the top of the tubes in the form of cylinders. Without further comminution—the cylindrical mass breaks up spontaneously into smaller pieces in the direction substantially perpendicular to the direction of flow—the hydrogel is freed from adherent sodium sulfate by washing and thus worked up to narrow-pored silica gel. The product dried at 200° C. has the following grain sizes:

| | Percent |
|---|---|
| Below 2 millimeters | 6.8 |
| From 2 to 6 millimeters | 48.5 |
| Above 6 millimeters | 44.7 |

The isothermal adsorption of water vapor from air of 80% relative humidity at 25° C. amounts to 28%, with reference to the dry substance. The adsorptivity of the product increases considerably if it is washed hot.

An apparatus for the continuous production of hydrogel containing silicic acid is shown diagrammatically by way of example in the accompanying drawing. Waterglass solution from a reservoir 1 and acid, such as sulfuric acid, hydrochloric acid or nitric acid, from a reservoir 2 (the said reservoirs being charged by means of pumps 3 and 4 and kept at a constant level by means of overflows 5 and 6) are led through quantity controls 7a and 8a (controlled by quantity meters 7 and 8) and through coolers 9 and 10 into a mixing vessel 11 in which is situated already prepared unstable silica sol which is vigorously stirred. The inflowing reactancts are controlled in amount so that the same pH value of about 2 to 5, preferably 3 to 4, indicated on the recording instrument 14 is maintained constantly in the mixing vessel. The mixing vessel is provided with a double jacket 12 for brine cooling by which the heat of reaction is rapidly withdrawn and a temperature lying between +5° and +10° C. is maintained constant in the mixing vessel. The unstable silicic acid sol formed in the mixing vessel is pumped by means of a large number of small membrane pumps 16 into tubes 20 of a heat-exchanger 19, the number of pumps corresponding to the number of tubes. The hydrosol ascending in the tubes is heated externally. Water may serve as the heating medium and this may be circulated by a pump 25. The heat extracted from the heating medium by the hydrosol is replaced by a heat exchanger 24 which may be operated with steam. The speed of flow of the unstable silicic acid sol in the tubes 20 is controlled so that the sol solidifies to hydrogel within the tubes. The solidified hydrogel is moved along by the pressure of the liquid flowing behind it and passes into a washing container 21 which is situated immediately above the tubular bundle 20 of the heat-exchanger 19. Desalted fresh water is supplied to the washing container at the top through the inlet 22. The washing water is continuously removed from the container at 23. The hydrogel rods leaving the tubular bundle 20 break up in the washing water into more or less long pieces which are slowly pushed upwards by the following hydrogel. By reason of the loss in weight of the gel mass in the water or salt-containing water, an undesired comminution does not occur. When the hydrogel has been conveyed to the surface of the washing water, it is practically free from salts and can be moved, for example on a conveyer belt 26, to the drying apparatus or some other point at which it can be worked up.

I claim:

1. In the process for continuously producing elastic hydrogels containing silicic acid from alkali silicates and inorganic acids with the intermediate formation of an unstable sol containing silicic acid the steps which comprise dividing the sol containing silicic acid into individual streams of the sol which streams have a cross-section up to about 70 millimetres and are heated to about 40° up to about 100° C. whilst being led through tubes having a smooth inner surface in such manner that the sol is solidified during its passage through said tubes to the hydrogel and removing the hydrogel in the form of the resultant rods from said tubes.

2. In the process for continuously producing elastic hydrogels containing silicic acid from alkali silicates and inorganic acids with the intermediate formation of an unstable sol containing silicic acid, the steps which comprise dividing the sol containing silicic acid into individual streams of the sol which streams have a cross-section up to about 70 millimetres and are heated to about 40° up to about 100° C. whilst being led through tubes having a smooth inner surface in such manner that the sol is solidified during its passage through said tubes to the hydrogel, removing the hydrogel in the form of the resultant rods from said tubes, breaking up said rods and purifying said rods by immersion in liquids suitable for the removal of salts adhering to the hydrogel.

3. In the process for continuously producing elastic hydrogels containing silicic acid from alkali silicates and inorganic acids with the intermediate formation of an unstable sol containing silicic acid the steps which comprise dividing the sol containing silicic acid into individual streams of the sol which streams have a cross-section up to about 70 millimetres and are heated to about 40° up to about 100° C. whilst being led through tubes which have a smooth inner surface and are directed upwardly, in such manner that the sol is solidified during its passage through said tubes to the hydrogel, removing the hydrogel in the form of the resultant rods from said tubes, and immediately immersing the resultant rods in a liquid suitable for the removal of salts adhering to the hydrogel.

4. In the process for continuously producing elastic hydrogels containing silicic acid from alkali silicates and inorganic acids with the intermediate formation of an unstable sol containing silicic acid the steps which comprise dividing into individual streams of the sol which streams have a cross-section up to about 70 millimetres and are heated to about 40° up to about 100° C. whilst being led through tubes having a smooth inner surface by means of converging pumps, arranged in parallel in such manner that the sol solidifies during its passage through said tubes to the hydrogel, the number of said converging pumps corresponding to the number of said streams, removing the hydrogel in the form of the resultant rods from said tubes, breaking up said rods and purifying said rods by immersion in liquids suitable for the removal of salts adhering to the hydrogel.

5. In the process for continuously producing elastic hydrogels containing silicic acid from alkali silicates and inorganic acids with the intermediate formation of an unstable sol containing silicic acid the steps which comprise dividing the sol containing silicic acid into individual streams of the sol which streams have a cross-section up to about 70 millimetres and are heated to about 40° up to about 100° C. whilst being led through tubes which have a smooth inner surface and are heated by means of a heating medium circulating about the outer surfaces of said tubes, in such manner that the sol is solidified during its passage through said tubes to the hydrogel, removing the hydrogel in the form of the resultant rods from said tubes, breaking up said rods and purifying said rods by immersion in liquids suitable for the removal of salts adhering to the hydrogel at temperatures between 20° and 100° C.

References Cited in the file of this patent

UNITED STATES PATENTS

| | | |
|---|---|---|
| 1,672,768 | Miller et al. | June 5, 1928 |
| 1,696,358 | Muller et al. | Dec. 25, 1928 |
| 2,178,955 | Draemann | Nov. 7, 1939 |
| 2,272,880 | Greenup | Feb. 10, 1942 |
| 2,672,650 | Westenberg | Mar. 23, 1954 |

UNITED STATES PATENT OFFICE
CERTIFICATE OF CORRECTION

Patent No. 2,871,099                                         January 27, 1959

Walter Ziese

It is hereby certified that error appears in the printed specification of the above numbered patent requiring correction and that the said Letters Patent should read as corrected below.

Column 1, line 29, for "first" read -- fist --; line 39, for "continuous" read -- continuously --; column 2, line 3, for "prapered" read -- prepared --; line 11, for "metail oxide" read -- metal oxide --; line 53 for "hydrogen" read -- hydrogel --; column 3, line 64, for "reactancts" read -- reactants --.

Signed and sealed this 26th day of May 1959.

(SEAL)
Attest:

KARL H. AXLINE
Attesting Officer

ROBERT C. WATSON
                                                                   Commissioner of Patents